US010176236B2

(12) United States Patent
Nguyen et al.

(10) Patent No.: US 10,176,236 B2
(45) Date of Patent: Jan. 8, 2019

(54) SYSTEMS AND METHODS FOR A DISTRIBUTED QUERY EXECUTION ENGINE

(71) Applicant: Microsoft Technology Licensing, LLC, Redmond, WA (US)

(72) Inventors: Patrick An Phu Nguyen, Palo Alto, CA (US); David Kryze, Mountain View, CA (US); Theodore Vassilakis, Los Altos, CA (US); Apostolos Lerios, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 340 days.

(21) Appl. No.: 14/807,807

(22) Filed: Jul. 23, 2015

(65) Prior Publication Data

US 2016/0034529 A1 Feb. 4, 2016

Related U.S. Application Data

(60) Provisional application No. 62/030,558, filed on Jul. 29, 2014.

(51) Int. Cl.
*G06F 17/30* (2006.01)

(52) U.S. Cl.
CPC .. *G06F 17/30545* (2013.01); *G06F 17/30474* (2013.01); *G06F 17/30672* (2013.01); *G06F 17/30923* (2013.01); *G06F 17/30979* (2013.01)

(58) Field of Classification Search
CPC ......... G06F 17/30545; G06F 17/30672; G06F 17/30923; G06F 17/303; G06F 17/30309;
(Continued)

(56) References Cited

U.S. PATENT DOCUMENTS

| 4,841,436 A | 6/1989 | Asano |
| 6,785,668 B1 | 8/2004 | Polo et al. |

(Continued)

FOREIGN PATENT DOCUMENTS

| CN | 101218803 A | 7/2008 |
| CN | 102461026 A | 5/2012 |

(Continued)

OTHER PUBLICATIONS

Office Action dated Mar. 8, 2017 issued in U.S. Appl. No. 14/486,995.
(Continued)

*Primary Examiner* — Scott A. Waldron
*Assistant Examiner* — Andalib F Lodhi
(74) *Attorney, Agent, or Firm* — Workman Nydegger

(57) ABSTRACT

Various embodiments of the present disclosure can include systems, methods, and non-transitory computer readable media configured to receive at least one database query to be executed. Code corresponding to the at least one database query can be generated. One or more optimizations to the generated code can be performed to produce specialized modular code. The one or more optimizations can include Just-In-Time (JIT) compilation techniques. Respective portions of the code can be distributed to a plurality of distributed computing systems for execution, wherein each of the distributed computing systems is connected to a portion of the plurality of distributed computing systems. A result for the at least one database query can be provided.

20 Claims, 4 Drawing Sheets

(58) Field of Classification Search
CPC ......... G06F 17/30483; G06F 17/30929; G06F 17/30979; G06F 17/2264; G06F 17/30474; G06F 17/30595
See application file for complete search history.

(56) References Cited

U.S. PATENT DOCUMENTS

| | | | |
|---|---|---|---|
| 7,668,798 B2 | 2/2010 | Scanlon et al. | |
| 7,707,141 B1 | 4/2010 | Outhred et al. | |
| 7,765,259 B2 | 7/2010 | MacVarish | |
| 8,200,594 B1 | 5/2012 | Bleiweiss | |
| 8,645,386 B2 | 2/2014 | Hess et al. | |
| 2003/0065648 A1 | 4/2003 | Driesch et al. | |
| 2004/0088406 A1 | 5/2004 | Corley et al. | |
| 2004/0128276 A1 | 7/2004 | Scanlon et al. | |
| 2004/0181378 A1 | 9/2004 | Gilmore | |
| 2005/0119988 A1 | 6/2005 | Buch et al. | |
| 2006/0143171 A1* | 6/2006 | Doerre | G06F 17/30619 |
| 2006/0164990 A1 | 7/2006 | Bhushan et al. | |
| 2006/0218129 A1 | 9/2006 | Muras | |
| 2007/0006294 A1 | 1/2007 | Hunter | |
| 2007/0087756 A1 | 4/2007 | Hoffberg | |
| 2007/0094171 A1 | 4/2007 | Burges et al. | |
| 2007/0266134 A1* | 11/2007 | Shyy | H04W 99/00 709/223 |
| 2007/0299836 A1 | 12/2007 | Hou et al. | |
| 2008/0065455 A1 | 3/2008 | Sun et al. | |
| 2008/0114752 A1 | 5/2008 | Friesenhahn et al. | |
| 2008/0154844 A1 | 6/2008 | Gao et al. | |
| 2008/0250401 A1* | 10/2008 | Puri | G06F 8/433 717/160 |
| 2008/0301136 A1 | 12/2008 | De et al. | |
| 2009/0083219 A1* | 3/2009 | Zane | G06F 8/30 |
| 2010/0058289 A1 | 3/2010 | Hudson | |
| 2010/0079336 A1 | 4/2010 | Skibiski et al. | |
| 2010/0095269 A1 | 4/2010 | Bouillet et al. | |
| 2010/0199069 A1* | 8/2010 | Kim | G06F 9/3897 712/30 |
| 2010/0235296 A1 | 9/2010 | Nakazato | |
| 2010/0278158 A1 | 11/2010 | Lee et al. | |
| 2011/0107273 A1 | 5/2011 | Ranganathan et al. | |
| 2011/0213778 A1 | 9/2011 | Hess et al. | |
| 2011/0320433 A1 | 12/2011 | Mohiuddin et al. | |
| 2012/0030244 A1 | 2/2012 | John | |
| 2012/0047158 A1 | 2/2012 | Lee et al. | |
| 2012/0155277 A1 | 6/2012 | Jain et al. | |
| 2012/0159304 A1 | 6/2012 | Listou | |
| 2013/0006888 A1 | 1/2013 | Mesika et al. | |
| 2013/0024484 A1 | 1/2013 | Banerjee et al. | |
| 2013/0054649 A1 | 2/2013 | Potapov et al. | |
| 2013/0073573 A1 | 3/2013 | Huang et al. | |
| 2013/0204811 A1 | 8/2013 | Morinaga et al. | |
| 2013/0212255 A1 | 8/2013 | Chao et al. | |
| 2013/0262443 A1* | 10/2013 | Leida | G06F 17/30448 707/722 |
| 2013/0332194 A1 | 12/2013 | D'Auria et al. | |
| 2014/0089252 A1 | 3/2014 | Bhide et al. | |
| 2014/0101083 A1 | 4/2014 | Nicholson et al. | |
| 2014/0172833 A1 | 6/2014 | Taylor | |
| 2014/0188841 A1 | 7/2014 | Sun et al. | |
| 2014/0214880 A1 | 7/2014 | Chi et al. | |
| 2014/0297353 A1 | 10/2014 | Srivastava | |
| 2015/0081701 A1 | 3/2015 | Lerios et al. | |
| 2015/0304198 A1 | 10/2015 | Angelov et al. | |
| 2016/0034529 A1 | 2/2016 | Nguyen et al. | |
| 2016/0034530 A1 | 2/2016 | Nguyen et al. | |
| 2016/0034547 A1 | 2/2016 | Lerios et al. | |
| 2017/0032016 A1 | 2/2017 | Zinner et al. | |
| 2017/0206256 A1 | 7/2017 | Tsriogiannis et al. | |

FOREIGN PATENT DOCUMENTS

| | | |
|---|---|---|
| CN | 103136217 A | 6/2013 |
| WO | 2006036127 A1 | 4/2006 |

OTHER PUBLICATIONS

Bouillet, et al., "A Tag-Based Approach for the Design and Composition of Information Processing Applications", In Proceedings of the 23rd ACM SIGPLAN Conference on Object-Oriented Programming Systems Languages and Applications, vol. 43, Issue 10, Sep. 2008, pp. 585-602.

Wongsuphasawat, et al., "Exploring Flow, Factors, and Outcomes of Temporal Event Sequences with the Outflow Visualization", In proceedings of IEEE Transactions on Visualization and Computer Graphics, vol. 18, Issue 12, Oct. 9, 2012, pp. 2659-2668.

"Extended Search Report Issued in European Patent Application No. 14843834.4", dated Apr. 18, 2017, 10 Pages.

Office Action dated Dec. 15, 2016 issued in U.S. Appl. No. 14/486,995.

U.S. Appl. No. 61/878,562, filed Sep. 16, 2013, Lerios et al.

U.S. Appl. No. 62/030,552, filed Jul. 29, 2014, Lerios et al.

U.S. Appl. No. 62/184,095, filed Jun. 24, 2015, Cutler et al.

U.S. Appl. No. 62/030,558, filed Jul. 29, 2014, Nguyen et al.

U.S. Appl. No. 62/030,560, filed Jul. 29, 2014, Nguyen et al.

"International Application No. PCT/US2014/055699, International Search Report and Written Opinion", dated Dec. 8, 2014.

"International Search Report & Written Opinion Issued in PCT Application No. PCT/US2015/042529", dated Oct. 23, 2015, 9 Pages.

"Written Opinion Issued in PCT Application No. PCT/US2015/042535", dated Oct. 23, 2015, 8 Pages.

"Second Written Opinion Issued in PCT Application No. PCT/US2015/042538", dated Nov. 3, 2015, 7 Pages.

Office Action dated Sep. 8, 2017 cited in U.S. Appl. No. 14/807,822.

Office Action cited in U.S. Appl. No. 14/810,144 dated Feb. 28, 2018.

Office Action dated Sep. 11, 2017 cited in U.S. Appl. No. 14/807,807.

Office Action dated Nov. 30, 2017 cited in U.S. Appl. No. 14/865,995.

"Non Final OFfice Action Issued in U.S. Appl. No. 14/486,995", dated Nov. 30, 2017, 23 Pages.

"Office Action Issued in U.S. Appl. No. 14/486,995", dated Jun. 14, 2018, 25 Pages.

"Office Action Issued in U.S. Appl. No. 14/807,822", dated May 2, 2018, 37 Pages.

"Notice of Allowance Issued in U.S. Appl. No. 14/810,144", dated Jul. 24, 2018, 9 Pages.

"Office Action Issued in CN Patent Application No. 201480062689.9", dated Jun. 21, 2018, 16 Pages.

* cited by examiner

SYSTEMS AND METHODS FOR A DISTRIBUTED QUERY EXECUTION ENGINE

CROSS-REFERENCE TO RELATED APPLICATIONS

The present applications claims priority from U.S. Provisional Patent Application Ser. No. 62/030,558, filed Jul. 29, 2014, entitled "Distributed Query Execution Engine Utilizing Just-in-Time Compilation", which is incorporated herein by reference.

FIELD OF THE INVENTION

The present technology relates to query execution. More particularly, the present technology relates to approaches for distributed query execution.

BACKGROUND

Query optimization is typically utilized in relational database management systems for purposes of determining the most efficient way to execute a given query by considering different approaches. Query optimization can be performed after queries are submitted by users to a database server, for example. In some instances, query optimization can involve determining an optimal approach for executing a query based on, for example, accessing the data being queried in different ways, through different data-structures, and in different orders. Each approach for executing a query can require a different amount of processing time. In some instances, processing times of the same query can range from a fraction of a second to hours, depending on the approach selected. Typically, the optimal approach for executing the query is the one that requires the least amount of processing time.

SUMMARY

Various embodiments of the present disclosure can include systems, methods, and non-transitory computer readable media configured to receive at least one database query to be executed. Code corresponding to the at least one database query can be generated. One or more optimizations to the generated code can be performed to produce specialized modular code. The one or more optimizations can include Just-In-Time (JIT) compilation techniques. Respective portions of the code can be distributed to a plurality of distributed computing systems for execution, wherein each of the distributed computing systems is connected to a portion of the plurality of distributed computing systems. A result for the at least one database query can be provided. Depending on the implementation, the code distributed to the distributed computing systems may, or may not be, optimized. In instances where the non-optimized is distributed, the code is compiled on every node. The advantage of this method is that there might be some capabilities available on the host system that can be compiled for differently on every compute node (if they have different hardware). This facilitates the implementation of features that work across a set of heterogeneous computing systems.

In an embodiment, the code for the at least one database query is generated entirely on-the-fly.

In an embodiment, at least one of: register allocation, inlining, constant folding, loop strength reduction, or loop-invariant code motion is performed.

In an embodiment, the generated code is combined with at least a portion of pre-compiled code.

In an embodiment, the code for the at least one database query is generated entirely on-the-fly and wherein the pre-compiled code is generated prior to receiving the at least one database query.

In an embodiment, the pre-compiled code is customized based at least in part on the code generated for the database query.

In an embodiment, the pre-compiled code is written in a high-level programming language.

In an embodiment, the pre-compiled code, when executed, performs vectorized instructions (SIMD) with a variable number of operands and the method further includes customizing the vectorized instructions (SIMD) using one or more operands included in the database query.

In an embodiment, execution of the code is based at least in part on one or more iterator-based execution nodes, wherein respective code associated with the one or more iterator-based execution nodes is able to be suppressed upon determining that the respective code does not need to be executed.

In an embodiment, one or more levels of code optimization can be performed, wherein each level of optimization introduces a further specialization to the code, and wherein each level of optimization is cached.

In an embodiment, at least one result associated with an iterator-based execution node resides in one or more processor registers and does not materialize into memory.

In an embodiment, the method further includes determining that the database query involves manipulation of one or more nested arrays and evaluating the one or more nested arrays based at least in part on the one or more iterator-based execution nodes.

In an embodiment, the method further includes processing each array in the one or more nested arrays as a series of rows.

In an embodiment, a caching mechanism that allows data items to be scheduled to the same distributed computing system across instances of a same query as the at least one database query is utilized.

In an embodiment, a caching mechanism that allows data items to be scheduled to the same distributed computing system across instances of different queries is utilized.

In an embodiment, the method further includes determining that at least one of the distributed computing systems are non-responsive and re-distributing respective portions of the optimized code corresponding to the at least one of the distributed computing system to one or more of the distributed computing systems that are responsive.

In an embodiment, a determination is made that at least one of the distributed computing systems are non-responsive while the at least one database query is being executed.

In an embodiment, the respective portions of the optimized code are dispatched to a plurality of distributed computing systems based at least in part on a local chunked sort technique.

Many other features and embodiments of the invention will be apparent from the accompanying drawings and from the following detailed description.

Figure 1:
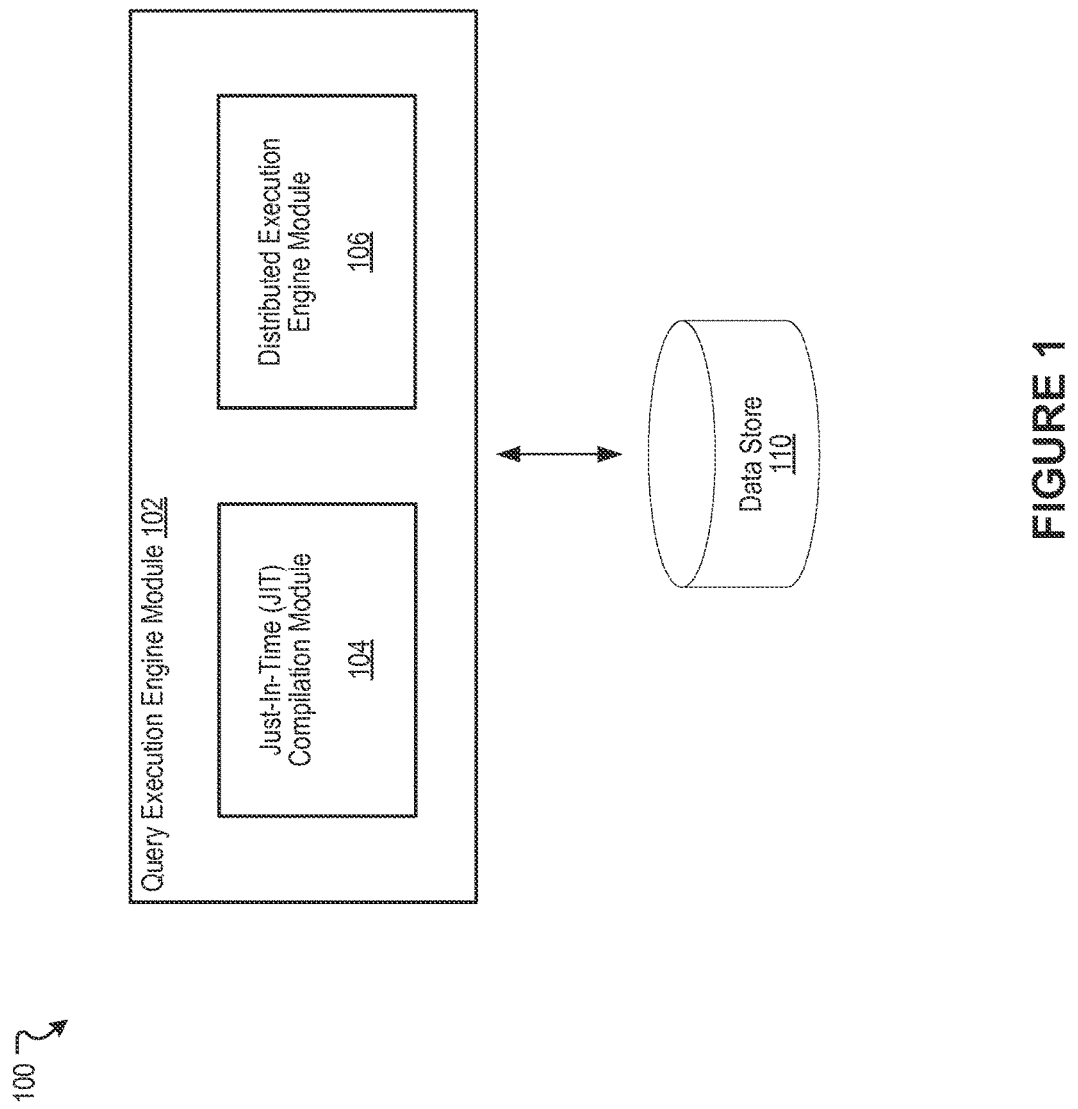
FIG. 1 illustrates an example system including a query execution engine module configured to optimize queries, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Distributed Query Execution Engine

Query optimization is typically utilized in relational database management systems for purposes of determining the most efficient way to execute a given query by considering different approaches. Query optimization can be performed after queries are submitted by users to a database server, for example. In some instances, query optimization can involve determining an optimal approach for executing a query based on, for example, accessing the data being queried in different ways, through different data-structures, and in different orders. Each approach for executing a query can require a different amount of processing time. In some instances, processing times of the same query can range from a fraction of a second to hours, depending on the approach selected. Typically, the optimal approach for executing the query is the one that requires the least amount of processing time.

In various embodiments, the approaches described herein allow optimization and execution of queries. In one example, the approaches can be applied to optimize queries that perform complex computations on large amounts of data. In some embodiments, the optimization of queries can utilize Just-in-Time (JIT) compilation and/or distributed execution techniques. For example, rather than providing generic execution code for all possible queries, the approaches described herein can generate code on-the-fly and for each specific query so that the optimization can be tailored to the query and/or the machine (e.g., computing device or system) on which the query is to be executed. In some embodiments, queries can be distributed for execution among a pool of machines. By utilizing such approaches, queries can be optimized efficiently and distributed for execution among many machines.

FIG. 1 illustrates an example system 100 including a query execution engine module 102 configured to optimize and execute queries, according to an embodiment of the present disclosure. As shown in the example of FIG. 1, the query execution engine module 102 can include a Just-In-Time (JIT) compilation module 104 and a distributed execution engine module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In some embodiments, the query execution engine module 102 can be implemented, for example, as the SQL-driven distributed operating system 202 of FIG. 2. The query execution engine module 102 run a computation graph and can include some or all components needed to execute the computation graph. In various embodiments, the query execution engine module 102 can implement features directed to JOIN algorithms, moving data across machine boundaries, and caching intermediate data. The query execution engine module 102 can also be configured to withstand some amount of failures in the hardware and/or network layer during execution of queries.

In some embodiments, the query execution engine module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the query execution engine module 102 can be implemented, in part or in whole, as software running on one or more computing devices or systems, such as on a user computing device or client computing system. For example, the query execution engine module 102, or at least a portion thereof, can be implemented as the SQL-driven distributed operating system 202 of FIG. 2, which may be running on a user computing device or a client computing system. Further, the query execution engine module 102, or at least a portion thereof, can be implemented using one or more computing devices or systems that include one or more servers, such as network servers or cloud servers. It should be understood that there can be many variations or other possibilities.

In various embodiments, the query execution engine module 102 can utilize the JIT compilation module 104 to generate code on-the-fly, for each specific query that is submitted, rather than using generic execution code for all possible queries. The queries can be submitted, for example, by a user operating a computing device to interact with an interface. In some embodiments, the interface may be the interface 204 of the SQL-driven distributed operating system 202 of FIG. 2 in which the features of the query execution engine module 102 can be implemented. However, the interface can also correspond to an interface of a database management system as well. By generating code on-the-fly, the query execution engine module 102 can allow for specific optimizations to be performed that are tailored with respect to the query and to the computing system on which the query is to be executed, thereby helping achieve optimal query execution performance. For instance, loop unrolling and inlining may be used to great effect.

The query execution engine module 102 can utilize a paradigm that is a significant departure from conventional state-of-the-art techniques and that is architected around a more complete framework than the state-of-the-art. In typical state-of-the-art systems, code generation is used sparingly for only a few manually identified "hotspots". In contrast, the query execution engine module 102 can generate all code on-the-fly, thereby providing much more potential for optimization. In some instances, a fine-grained approach to modularizing the query execution engine module 102 can be applied. Such an approach can also provide opportunities to leverage existing compiler technology, for example, the LLVM project (http://www.llvm.org), to perform well-known optimizations such as register allocation, inlining, constant folding, loop strength reduction and loop-invariant code motion.

In various embodiments, the query execution engine module 102 can utilize iterator-based execution units (e.g., nodes). For example, the basic unit of computation in a computation graph run by the query execution engine module 102 can be an execution node. An execution node is defined as an iterator. That is, it defines functions such as Init, Next, and Get, for example. The use of an iterator, rather than a data buffer, as a means of communication for our operators, allows a more fine-grained node structure than is commonly used in the state of the art. That is because the state-of-the-art defines operations in and out of a memory buffer, so the computation must be materialized into a memory buffer. In various embodiments, the query execution engine module 102 instead utilizes the iterator model which does not require intermediate materialization of results. In some embodiments, only when the query execution engine module 102 deems necessary to materialize the output out of registers and into memory is the result materialized. This approach allows the query execution engine module 102 to suppress the code of any node if the code is deemed unnecessary. This can be done using well-known compiler techniques, such as inlining and CFG simplification, for example. For example, in a processor, there are a limited number of registers. So we have to use memory sometimes. This happens quite frequently, because many operations are quite complex and require registers. In one example, imagine you have a node that performs the sum of two inputs, C=A+B. In turn, each input is the result of a simple operation. We may store the results in a register as follows:

register1=A=simple operation, for instance, a constant: 4
register2=B=simple operation, for instance, a constant: 5
register3=register1+register2 (4+5)

If, on the contrary, imagine that computing A (and B) is a complex operation. For instance, perform some regular expression matching. That will require more registers than are available, so we might choose to compute A, store that in a place into memory, then compute B, then store that in a register. Then load A into another register and add the registers together.

In other words, when the operation is very simple, then we can use more registers. When it is not we use memory.

This is done by the compiler, and not decided by us. The compiler might choose to make these decisions for any part of the code. That is why this approach is flexible: the compiler takes care of making this decisions for us, so we do not have to decide up front whether we have to use nodes that are simple, or nodes that are complex.

In various embodiments, the output being materialized can correspond to a particular iterator-based execution node. As mentioned, the execution engine can suppress code. For example, the execution engine removes code when it is not needed, essentially when it is not called by anything. Note nodes are written in a general manner, but at runtime, the nodes are specialized to execute only a particular function. For instance, a node might realize a function that can be configured depending on an option is set.

```
function node( ) {
  if option is set: PerformOptionOne( )
  else: PerformOptionTwo( )
}
```

In this example, for a given query, the option is either set or not set. So, either PerformOptionOne( ), or PerformOptionTwo( ), may be completely eliminated.

In various embodiments, the execution engine can determine that code is deemed necessary for execution. This can be done, for example, when the code is unused ("dead code" elimination is a standard term). There are other events during which code might be technically removed, but they are typically called something else (e.g., inlining, CFG simplification, etc.). Those operation may remove code, but sometimes they add code, too.

In various embodiments, the query execution engine module 102 can utilize a partial specialization code molding technique. In some instances, because all of the code run for a particular query can be generated, this allows for maximum optimization. This comes at a cost of greater latency during run-time, and also, in typical systems, implies more complexity in the execution engine, because the generated code is somewhat close to assembly and does not use high-level language constructs to implement complex algorithms. In contrast, the query execution engine module 102 does not suffer from such drawbacks, thanks in part to an innovation referred to as code molding. This technique allows users to write code in a high-level language, such as C++, precompile the code offline, combine it with generated code online, specialize the code to the particular query on-the-fly, and run a fully optimal code.

Note that the C++ compilation, which includes parsing C++, resolving dependencies, a preprocessor, etc., is an expensive operation which is performed offline. The result of the compilation is a generic algorithm, which may be used for all queries. The code molding specializes this code for a class of queries. For instance, we may use a generic vector addition with a variable number of operands and compile it in a high-level language. During code molding, the code can be customized for the query at hand, for instance, with 5 operands.

As mentioned, in various embodiments, code can be specialized for a class of queries. For example, almost all of our operators are customized. In most cases, there are simple options. For instance, we may have a sorting node. That node can do sorting in ascending or descending order. We may have a node that computes the top N rows given a criterion. The N is a specialized variable. We may have a node that computes GROUP BY. That node may implement multiple algorithms of arriving to the same result. The optimizer would choose the most appropriate algorithm, then we would only compile the version for that algorithm.

In addition, code molding can be applied at multiple levels during the lifetime of the query execution. Code molding can be used to specialize a node to a particular class of queries, rather than a single query. This allows us to achieve the performance of manually generated assembly code for a query, with the maintainability and readability of a high-level language such as C++, by leveraging compiler technology.

In various embodiments, the query execution engine module 102 utilizes an SQL language that allows the manipulation of arbitrary levels of nested arrays. That is, it allows arrays, and arrays within arrays, all with complex data types. The query execution engine module 102 can be architected to use the Iterator framework described above for each level, so that an array can be processed as any series of rows. An array within an array is also a series of rows, and so on and so forth. This technique allows the query execution engine module 102 to employ a uniform set of operators to achieve maximum generality. Combined with the code molding described above, this also allows maximum efficiency.

To operate on large amounts of data, the query execution engine module 102 includes a distributed execution engine module 106 that is configured to work on a pool of distributed machines. These machines may be, for example, a set of computing systems that are able to communicate over a network (e.g., the Internet) or compute nodes of a cloud computing system or platform, to provide some examples.

In some instances, one of the most useful, and yet complex, operators used in a distributed computation is the shuffle algorithm. It redistributes the data so that each machine participating in a computation receives a well-defined part of a computation. This is done to minimize interdependencies in the computation. However, this is a quadratic operation in the sense that all machines (e.g., computing devices or systems) contain data pertaining to another machine, so all machines have to connect to all other machines. This becomes challenging to achieve at minimum latency when the number of machines exceeds a hundred or more. In various embodiments, the distributed execution engine module 106 can implement a shuffle algorithm that scales to tens of thousands of machines. The shuffle algorithm uses a local chunked sort to dispatch the data. In that way, each machine only has to establish connections to a handful of other machines at a time. It may also send more data at a time. These techniques maximize the setup costs and minimize latency overall. Finally, because there exists a full order for each machine pair, it is possible to re-start the transfer should a failure occur. Thus, unlike the state-of-the-art, the algorithm is robust to failures, minimizes latency, and scales to a large number of machines. By full order for each machine pair, we mean that we send data in an ordered fashion, from one machine to another. Because there is an order, it is simple for us to keep a watermark of what has already been sent. Anything that was not received above a watermark can be asked for again. With respect to local chunked sort, "local" can refer to one or more nodes and "chunk" involves sorting and sending the data in batch. In other words, local chunked sort means that we take a small batch of data, sort it, and then send it.

In some instances, when running in a distributed environment, it is beneficial to cache data coming from sources in each of the computation cells. Caching can be a difficult task when it is possible for machines to disappear out of the computation pool, either because they experience a hardware failure, temporary network congestion, or are simply in use by another query. In various embodiments, the query execution engine module 102 is configured to use a caching mechanism that allows data items to be scheduled to the same machines across instances of the same query, or across different queries. In the face of failure, the query execution engine module 102 uses a dynamic rebalancing scheme which allows dynamic detection of failures during a query and rebalancing the work. Thus, there is a full duplex communication in the execution machines which allows for back pressure to be applied from the bottom nodes to nodes higher in the hierarchy. In doing so, the work can be redistributed in such a way that globally, most caches continue to remain valid. This can be done at minimum computational and latency cost.

It is noted the components shown in this figure and all figures herein are exemplary only, and other implementations may include additional, fewer, integrated, or different components. Some components may not be shown so as not to obscure relevant details.

Figure 2:
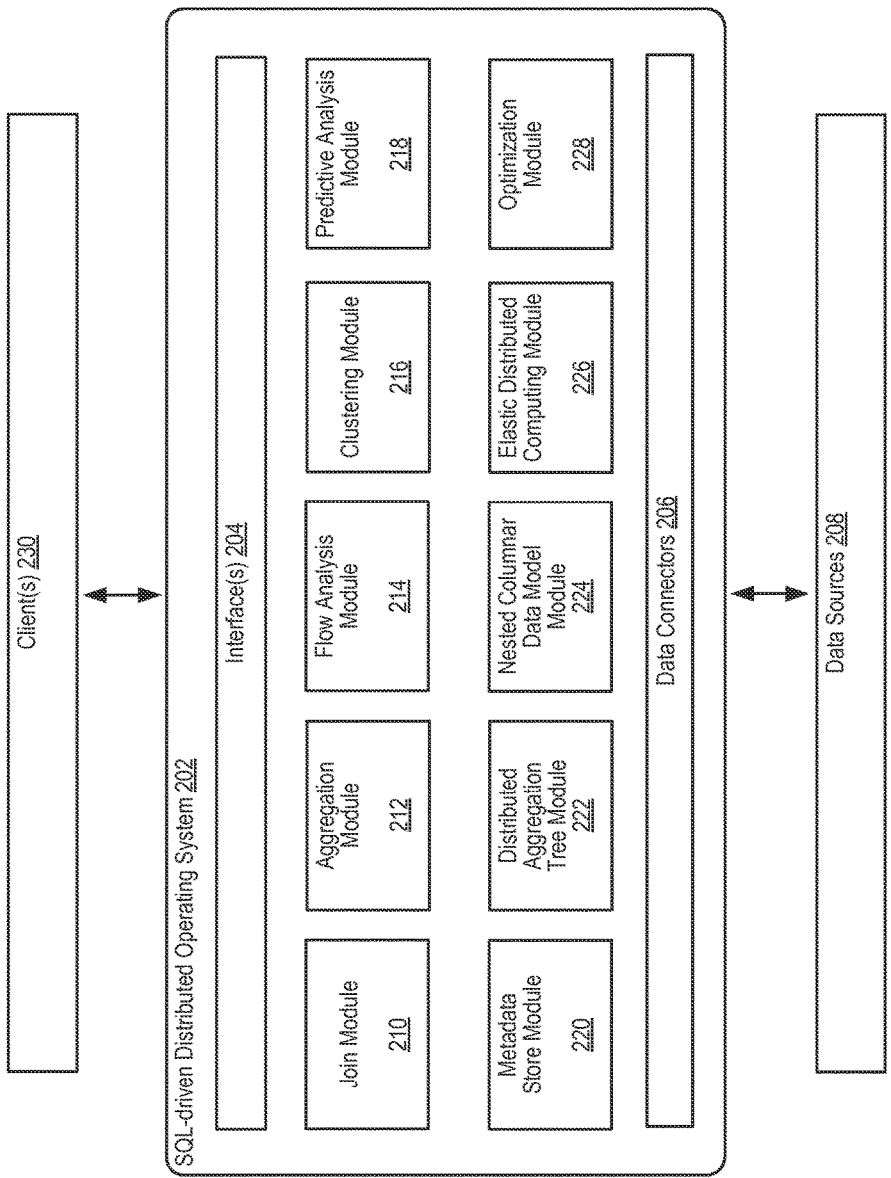
FIG. 2 illustrates an example architecture of an example distributed operating system, according to an embodiment of the present disclosure.

FIG. 2 illustrates an example architecture of an example distributed operating system 202, according to an embodiment of the present disclosure.

The example distributed operating system 202 can include various interfaces 204. Such interfaces can include, for example, client-side data connectors (e.g., ODBC, JDBC, Odata connectors). For example, various clients 230 (e.g., software-based clients) running on computing systems can be utilized to interact with the SQL-driven distributed operating system 202 through the interfaces 204. Such clients 230 can include, for example, an SQL client (e.g., workspace), data visualization clients, integrated desktop environment (IDE) clients, statistical analysis clients, spreadsheet clients, business intelligence tools, etc. The SQL-driven distributed operating system 202 can also include data connectors 206 which can facilitate connections to external data sources including, for example, Lightweight Directory Access Protocol (LDAP) servers that can be used, for example, to authenticate users of the SQL-driven distributed operating system 202. The SQL-driven distributed operating system 202 can also connect data sources and/or data sinks using the data connectors 206.

As mentioned, users can interact with the SQL-driven distributed operating system 202 through one or more clients 230. Through the client(s) 210, users can submit SQL commands to configure, or operate, the SQL-driven distributed operating system 202. As mentioned, these SQL commands can be issued through the interface 204 and the SQL-driven distributed operating system 202 can be configured to provide responses to the SQL commands to the client(s) 210 through the same interface 204. Such responses may include retrieved data, status messages, and/or error messages, for example.

In various embodiments, the SQL-driven distributed operating system 202 can include a metadata store module 220 that can be configured to retain various information including, for example, data sources and data sinks (e.g., database table definitions), other SQL entities defined by users in the course of using the SQL-driven distributed operating system 202 (e.g., views, functions, etc.), scripts (e.g., scripts including SQL statements), security information (e.g., users, user access rights, roles, passwords, etc.), activity logs (e.g., login/logout activity, queries previously executed through the SQL-driven distributed operating system 202, etc.), configuration parameters (e.g., a flag indicating whether experimental features are enabled or disabled), dynamically deduced information about the SQL-driven distributed operating system 202, and any related data (e.g., range of values for a column of a database table; network state, speed, and/or other characteristics; etc.).

The SQL-driven distributed operating system 202 can include a distributed aggregation tree module 222 that can be configured to efficiently aggregate data across multiple compute nodes. For example, when computing the sum of a column across two million rows, stored in two shards of one million rows each, the distributed aggregation tree module 222 can utilize two leaf nodes in the aggregation tree, one per shard, to compute the sum for each shard. A third (root) node, together with parent nodes of the leaf nodes, can be utilized to compute the final sum of the two sums corresponding to the two shards. Sharding is a type of database partitioning that separates very large databases, or tables, the into smaller, faster, more easily managed parts called shards or data shards.

The SQL-driven distributed operating system 202 can include a nested columnar data model module 224 that can be configured to support columns whose type is not a scalar traditionally found in databases, but is, instead, a complete object with multiple fields, which may be scalars, other objects, or arrays thereof. Moreover, the nested columnar data model module 224 may store data in such table columns by storing values across all rows for one field in one block, followed by values across all rows for the second field in a second block, and so on, to generate the nested columnar model. This nested columnar model is in contrast to a row-oriented model where values for all columns and fields in one row are stored in one block, followed by values for all columns and fields in a second row stored in a second block, and so on.

The SQL-driven distributed operating system 202 can include an elastic distributed computing model module 226 that can be configured to execute computation in a distributed fashion based, in part, on a generalization of Distributed Aggregation Trees. The elastic distributed computing model module 226 can be utilized to use more or less compute nodes, as necessary, for the specific computation at hand. For example, a simple addition of two numbers may use a single compute node, while computing the logarithm of every value in a single column of a table with a million rows may engage multiple nodes to process different portions of the table concurrently. This distribution of workloads among compute nodes can be determined based on the computational complexity of the workload and/or the availability of compute nodes (e.g., the number of available compute nodes, the system resources available (e.g., CPU, GPU, memory, etc.) for the compute nodes, etc.).

The SQL-driven distributed operating system 202 can include an optimization module 228 that can be configured to enhance or fine-tune the manner in which queries are executed so that their performance is aligned with the end-user's needs. This can include, for example, simple, traditional techniques (e.g., query rewriting), as well as more complex techniques that accommodate a variety of business needs and context (e.g., ad hoc systems for interactive query issuance and experimentation, batch systems for massive data analysis without interaction, or training sessions where accuracy is secondary to consistency to prevent trainee confusion). The optimization module 228 can use both static information (e.g., the query text and explicitly specified priorities) and dynamic information (e.g., statistics on tables collected from prior queries, network state of data source replicas, etc.) to perform the optimization.

Further, with respect to the optimization module 228, the notion of optimization can extend well beyond traditional query optimization. The optimization of SQL command execution can involve in part the following techniques, as well additional ones (of a deeper technical nature). One example optimization involves traditional query rewriting. For example, the filter x>20 AND x>10 can be simplified to x>20. Another optimization can utilize other traditional techniques, such as caching of frequently used data.

The optimization module 228 can also provide novel extensions of traditional techniques. For example, computer programs expressed in high level languages, such as SQL, are typically executed using one of the following processes to translate the source program into executable native code. One example process involves one-time compilation in which the whole program is translated into a native code representation, and then the latter is executed. Another example process involves interpretation in which an interpreter executes (interprets) one high level instruction, or part thereof, at a time by executing the native code representation of that instruction, and where that native code representation is fixed for each high level language instruction, and embedded within the interpreter. Another example process involves Just-in-Time (JIT) compilation in which an interpreter executes (interprets) one high level instruction, or part thereof, at a time by executing the native code representation of that instruction, unless a sequence of instructions that are executed very regularly is encountered (hotspots), and which the interpreter then translates into native code en mass such that the whole program is translated into a native code representation, and then runs that native code instead of interpreting the individual instructions in that sequence.

In various embodiments, the optimization module 228 uses a variation of JIT. For example, the optimization module 228 can translate every query, however complex it may be, into a single native code representation for the whole query, thus enabling the optimization module 228 to apply many well-known optimization techniques across different parts of the query, such as register allocation, loop unrolling, inlining, and constant folding. In a sequence of queries, the optimization module 228 translates and optimizes one query at a time in a pipelined fashion, e.g., while the first query is executing, the second query is being translated and optimized. The optimization module 228 also uses innovative techniques so that the single native representation resulting from the above translation and optimization is parameterized in a manner that the same representation may be invoked to process different shards of a data source (e.g., each shard may need different parameter values, such as the name of the file containing the shard).

Another optimization involves support for advanced features of standard SQL. For example, if unrelated queries Q1 and Q2 must happen after a row has been inserted into a table T, then using traditional procedural/imperative programming, a user may express that dependency using a hypothetical expression similar to:
IF INSERT(T) THEN {Q1; Q2}

That expression, however, doesn't just specify that Q1 and Q2 should happen, it also specifies that Q1 should happen first and Q2 should happen next. This unintentional side-effect is eliminated if the user uses SQL triggers, which, being part of the SQL language, follow its functional/declarative paradigm: the optimization module 228 may then choose to execute Q1 and Q2 concurrently.

In some embodiments, the optimization module 228 extends storage of data accessed by queries in formats that are optimized for efficient retrieval, based on user hints or actual usage patterns. For example, use of column-oriented formats instead of row-oriented formats, or sharding of data across the compute nodes of a multi-compute node installation of the SQL-driven distributed operating system 202.

In some embodiments, the optimization module 228 can utilize user-specified information regarding the data sources and data sinks. For example, based on user-specified information indicating that database R is a replica of a primary database P, the optimization module 228 can obtain the same data from either P or R at the discretion of the optimization module 228.

In some embodiments, the optimization module 228 can utilize dynamically-deduced information regarding data sources and sinks. For example, the optimization module 228 may deduce from past queries that a table's age column contains values which range from 0 to 110 even though the type of that column is an integer capable of representing a much larger range; therefore the shards of this table should not partition the full integer range in equal-sized buckets, but should partition the range 0-110 instead (making an allowance in the edge buckets for negative values and values exceeding 110, should they appear at a later time, possibly by accident).

In some embodiments, the optimization module 228 can utilize dynamically-deduced information regarding the state and performance of various resources associated with the optimization module 228. For example, the optimization module 228 may observe that, at the moment, data source P is inaccessible so all data access for P's data needs to use P's replica R instead; or P and R are both available but R is twice as fast as P, so R should be used for twice as many operations as P.

In some embodiments, the optimization module 228 can utilize business rules. For example, when a query is executed by the CEO, the optimization module 228 may give that query a higher priority than if a query is executed by an intern; or, in a training session where 100 trainees all execute the same query per the instructor's advice nearly concurrently, the optimization module 228 may execute the query once and return the same result to all participants.

In some embodiments, the optimization module 228 can utilize analysis of past usage patterns. For example, if a data source is most heavily used during the times of day that two of US, Europe, and Asia are in business hours, then the optimization module 228 may delay certain operations (those that the user stated may be delayed until a later time) until a single region is in business.

In some embodiments, the optimization module 228 can utilize knowledge (with reasonable certainty) of future events. For example, the optimization module 228 may deduce that a query Q against data source P executed now, at 2:55 am, is expected to run for 10 minutes given current load on P, and, if executed on P's replica R instead, it will run for 15 minutes given current load on R. However, the optimization module 228 may also determine that current load is not always an accurate predictor: Q, if executed now on P, will likely run for 25 minutes, not 10, because the optimization module 228 is aware of a separate, nightly 3:00 am query that is scheduled to start 5 minutes from now, and will overload P; so, instead, the optimization module 228 may choose to run Q on R, instead.

In some embodiments, the optimization module 228 can provide an allowance for absolute or probabilistic error margins. For example, consider a query for the average height of 1,000 subjects, of which 100 are stored on a currently slow or inaccessible data source. The optimization module 228 may ignore those 100 subjects, and return quickly the average height of the remaining 900, if the specified allowed error margin in the execution of the query is 10% and either (i) (absolute margin) prior access to the data for those 100 subjects has enabled the optimization module 228 to cache the knowledge that their minimum and maximum heights are within 1 inch of the average of the remaining 900 subjects or (ii) (probabilistic margin) the 100 subjects are only 10% of the total population and therefore, if they are a random subset, they are unlikely to sway the average height.

The SQL-driven distributed operating system 202 can include a join module 210 that can be configured to efficiently perform SQL joins, for example, of database tables from the same data source (e.g., relational databases) or from multiple, disparate sources (e.g., relational databases and NoSQL-based databases). An SQL join can be used to combine records from two or more tables in a database, for example, by combining fields from the tables using values common to each to create a set that can be saved as a new, separate table or used as it is. For example, the join module 210 can handle a join of a small database table and a large database table by loading the small database table in the cache or Random Access Memory (RAM) of one or more compute nodes that are involved in the join and by sharding the large table across multiple, or all, compute nodes.

The SQL-driven distributed operating system 202 can include an aggregation module 212 that can be configured to efficiently perform a variety of SQL aggregations, for example, using Distributed Aggregation Trees and other performance enhancement techniques. These aggregations can include standard SQL aggregation functions, as well as user-defined functions (UDFs).

The SQL-driven distributed operating system 202 can include a flow analysis module 214 that can be configured to perform the computations that may be needed to drive visualizations, for example, through a data visualization client 230. The flow analysis module 214 can also be configured to analyze other flows such as customer flows, which can include paths customers take to purchase, churn, and other insights into customer behaviors. Analysis across such customer interactions can lead to increased customer acquisition, loyalty, and product adoption. In another example, the flow analysis module 214 can also be configured to analyze device behavior flows, which can include paths leading to suboptimal device performance, or even overloading and failure. Such analysis can be used for reducing downtime and ensuring business continuity, for example.

The SQL-driven distributed operating system 202 can include a clustering module 216 and a predictive analysis module 218 that can be configured to perform user-level analytics operations, for example, by using one or more of the other modules of the distributed operation system 202 as building blocks. In some instances, predictive analysis can include algorithms that are expressed in SQL and rely on machine learning techniques, such as neural networks and genetic programming.

As mentioned, the SQL-driven distributed operating system 202 can be utilized to submit SQL commands, for example, through an interface 204 (e.g., workspace interface). SQL is standardized by both the American National Standards Institute (ANSI) and the International Organization for Standardization (ISO). The SQL-driven distributed operating system 202 can be configured to understand and act upon standard SQL. Additionally, in various embodiments, the SQL-driven distributed operating system 202 can extend the standard SQL in a number of ways. For example, the SQL-driven distributed operating system 202 can extend repeated fields and associated, high-performance operations on them. Generally, most table columns in SQL are of scalar quantities, e.g. strings or text, numbers, dates, timestamps, to represent homogeneous collections of objects. In standard SQL, one usually creates a table where each collection element is stored in a separate row. In various embodiments, when utilizing the SQL-driven distributed operating system 202, a column value may be an array (a repeated field). Moreover, that array may contain so-called NULL elements, i.e. elements with an undefined value. Also, the SQL-driven distributed operating system 202 can define SQL functions that extend the set of SQL built-in functions and operate on arrays. These functions are designed to achieve high-performance. For example, arrays that represent small sets may be stored as integer bitmasks in which case array comparison is performed using a single-step comparison of their bitmasks.

In another example, the SQL-driven distributed operating system 202 can extend nested fields and associated, high-performance operations on them. Typically, in order to store complex objects in SQL tables, one usually creates a table whose columns are the fields of the complex object class; then, each row represents a single object instance. For example, the object class Point(Integer x, Integer y) is stored as a table with integer columns x and y; the instance Point(1, 2) is stored as the table row (1, 2). In various embodiments, when utilizing the SQL-driven distributed operating system 202, a column type may be an object class, and its value may be an object instance. Moreover, instances may be NULL, i.e. an undefined instance of the object class. Also, the SQL-driven distributed operating system 202 can define SQL functions that extend the set of SQL built-in functions and operate on such columns (nested fields). These functions are designed to achieve high-performance. For example, the SQL-driven distributed operating system 202 may store a hash value alongside each object instance, and thus determine that two objects are unequal during a SQL equi-join using a single-step hash value comparison instead of comparing all component fields of the two objects one-by-one.

In some embodiments, the SQL-driven distributed operating system 202 can extend nested/repeated or repeated/nested fields and associated, high-performance operations on them. The above repeated and nested fields, as well as standard scalar quantities may be intermixed in arbitrary ways. For example, the type of a table column may be an array of objects, with each object containing a field which is itself an array of integers.

In some embodiments, the SQL-driven distributed operating system 202 can extend user-defined functions (UDFs). Typically, standard SQL defines a number of built-in functions, many of which the SQL-driven distributed operating system 202 implements, to perform analysis. For example, SQL defines the AVG(c) function, which computes the arithmetic mean across all or a subset of values (presumed numeric) within column c of some table. The SQL-driven distributed operating system 202 can allow for a user to extend the set of supported functions via functions composed by the user in any language. Some example languages include Lua, Jython, and Java, but the integration of additional languages is an easy matter for anyone skilled in the art. Moreover, the manner in which the user defines new functions is by issuing commands, through the SQL-driven distributed operating system 202, that are SQL-like in design, but not part of the SQL standard. Thus, for example, the user may issue this SQL command to define a function extract(c) which receives a text string and returns the portion of it that is enclosed by square brackets:

```
CREATE FUNCTION extract(data VARCHAR)
  RETURNS VARCHAR LANGUAGE JYTHON AS $$
  def extract(data):
    i0 = data.find("[")
    i1 = data.find("]")
    return data[i0 + 1:i1]
$$;
```

In some instances, UDFs, as described above, operate on scalar quantities and return scalar quantities. The SQL-driven distributed operating system 202 also supports UDFs which return complete tables. These Table-Valued Functions (TVFs) make it possible, for example, for a UDF (and TVF, in that case) to read a spreadsheet file, for example, from a data store, and return its contents as a table whose rows and columns reflect the original file's organizational structure. UDFs, as described above, are insular: they operate against their parameters using operations natively available within the chosen language, and return a result, be it a scalar or a table. However, the SQL-driven distributed operating system 202 (unless configured otherwise for security reasons) also allows UDFs to invoke external services as well. For example, a UDF implemented through the SQL-driven distributed operating system 202 may receive as parameters (i) the name of an existing image file in Joint Photographic Experts Group (JPEG) format and (ii) the name of a non-existent image file in Portable Network Graphics (PNG) format. In this example, the UDF may invoke an executable that reads the former file, converts its format from JPEG to PNG, and writes out the latter file. The UDF returns the undefined value NULL, if the operation succeeded; otherwise, it returns a string containing the error encountered. In another example, a UDF implemented through the SQL-driven distributed operating system 202 may receive as its single parameter a matrix, invoke a native executable that is capable of performing matrix inversion using custom, high performance hardware, feed the parameter matrix into the executable via its standard input stream, read the inverted matrix via the executable's standard output stream, and return that result. In another example, a UDF implemented through the SQL-driven distributed operating system 202 may receive as parameter a United States address that lacks a zip code, forward that address to a public web service provided by the United States Postal Service to locate the proper zip code (this can be done via an HTTP request similar to a browser navigating to the usps.com zip code lookup page), receive the zip code, and return that result.

In this manner, the set of possible computations which the SQL-driven distributed operating system 202 may perform is unbounded: any computation that can be expressed in any computer language (not just those supported as composition languages for UDFs implemented through the SQL-driven distributed operating system 202), even ones that execute partly on a different set of computing resources, can be invoked by queries submitted through the SQL-driven distributed operating system 202, for example.

Additionally, standard SQL does not provide a mechanism for a user to create a parameterized, named sequence of SQL commands, which is a sequence of commands where, for example, the name of a table used in these commands is supplied as a parameter. The SQL-driven distributed operating system 202 can provides this facility or "pipelines". A pipeline is akin to what one skilled in the art may consider a procedure, and may be invoked using another command by which the SQL-driven distributed operating system 202 has extended standard SQL. The SQL-driven distributed operating system 202 also includes extensions to other parts of the SQL standard for the benefit of the above extensions. Anyone skilled in the art may deduce the adjunct extensions mandated by the ones listed above. For example, the standard SQL information schema can only describe the standard SQL data types. In contrast, the SQL-driven distributed operating system 202 can extend the SQL information schema to address nested and repeated fields.

In addition to extending SQL, the SQL-driven distributed operating system 202 can also extend the state of the art in data analytics in a number of dimensions. The SQL extensions described above necessitate additional extensions to other functional components of the SQL-driven distributed operating system 202. For example, the SQL-driven distributed operating system 202 can extend existing file formats so that they may store tables containing nested and repeated fields. In one example, consider a table with two rows, each with two columns, the first column being the name of a point of text type, and the second column being its 2D coordinates of a custom nested type {x,y}, where x and y are both integers. The two rows are:

a, {x:1, y:2}
b, {x:3, y:4}

In this example, the extension of file formats provided by the SQL-driven distributed operating system 202 allows for regular, row-oriented storage of the above table in a file with contents "a 1 2 b 3 4". The extension of file formats provided by the SQL-driven distributed operating system 202 also allows for top-level-only column-oriented storage of the above table in a file with contents "a b 1 2 3 4". In this format, a query that filters out rows based on the value of the first column may read only the first third of the file to decide which subset of rows meet the filtering criteria. The extension of file formats provided by the SQL-driven distributed operating system 202 can also allow for column-oriented storage of the above table at all levels (even grouping all x values together ahead of the y values) in a file with contents "a b 1 3 2 4". This format helps further with queries that filter rows based on the value of an nested field.

With respect to the SQL-driven distributed operating system 202, what constitutes a data source or sink is broader than is typically the case in most software systems that manage or operate on data. For example, the SQL-driven distributed operating system 202 makes use of existing inter-connectivity interfaces (e.g., ODBC) so that users may couple the SQL-driven distributed operating system 202 with existing compatible software components (e.g., ODBC drivers) to enable the SQL-driven distributed operating system 202 access to data sources and sinks supporting such interfaces. Moreover, through the use of TVFs, users may transform arbitrary data sources into tables managed by the SQL-driven distributed operating system 202. Furthermore, the data source and/or data sink APIs provided by the SQL-driven distributed operating system 202 may be extended to provide access to arbitrary sources (e.g., live connections to cameras, microphones, temperature, or GPS sensors) or sinks (e.g., switches, actuators, or motors).

Further, with respect to the SQL-driven distributed operating system 202, what constitutes a computation is broader than is typically the case in most software systems. Despite using SQL, the SQL-driven distributed operating system 202 is not limited to the operators mandated by the SQL standard. For example, operators utilized through the SQL-driven distributed operating system 202 may be used to effect analysis and manipulation of image and other media.

UDFs, pipelines, the scripts, data source/sink extensions, and other mechanisms are all ways in which the SQL-driven distributed operating system 202 may be extended by users. The SQL-driven distributed operating system 202 can include a variety of such mechanisms, some intended for training purposes, and others intended for use in production deployments as building blocks of higher-level operations. For example, the SQL-driven distributed operating system 202 can include UDFs to re-compress an image from JPEG to PNG format; pipelines and scripts for clustering, descriptive, and predictive analytics; and TVFs to turn an Excel file into a table and vice versa.

In some embodiments, the SQL-driven distributed operating system 202 can provide auditing of its activity. That activity may be analyzed using an interactive data flow visualization tool, as well as through the SQL-driven distributed operating system 202 itself, and thus subjected to arbitrary complex analyses.

In various embodiments, the SQL-driven distributed operating system 202 can be installed on various computing platforms including, for example, computing devices, computing systems, cloud computing systems, to name some examples. An administrator, or user, of the SQL-driven distributed operating system 202 can allow the SQL-driven distributed operating system to operate at various times throughout the day (e.g., overnight) to perform various operations (e.g., computations). Such operations may be performed with respect to any security constraints, for example, regarding data encryption and/or data movement.

In various embodiments, the SQL-driven distributed operating system 202 can support resource sharing techniques. For example, the SQL-driven distributed operating system 202 can be running on a computing system of a second user and can be configured to charge a first user that initiates an operation that is performed by the computing system of the second user. Similarly, storage space can also be made available through the computer system of the second user and the SQL-driven distributed operating system 202 may use the storage space for storing temporary data which may be subject to any security constraints, for example, regarding data encryption and/or data movement. In various embodiments, the second user may be compensated based on the usage of the storage space.

Such resource sharing techniques may also be employed equally well in server settings. For example, the SQL-driven distributed operating system 202 may be used to optimally allocate resources (e.g., computing resources, storage resources, etc.) across servers in a computing datacenter. In another example, a United States company that has a fixed amount of computing resources but uses them very little at night may make its resources available to other companies that are located in Europe, thereby allowing such companies to take advantage of the computing resources during their business hours. In another example, a distributed operating system 202 can be implemented as a cloud computing-based service may rent out and guarantee a fixed amount of computing resources to a customer while still reserving the right to use unused portions of those resources for other internal purposes, or for other customers, provided such use is terminated as soon as the customer wishes to re-engage these resources for her own purposes.

The SQL-driven distributed operating system 202 need not operate on large computer systems, be they server or desktop computers. For example, a light footprint version of distributed operating system 202 may operate on portable devices including, for example, cell phones and/or tablet computing devices. Such an approach allows for the SQL-driven distributed operating system 202 to act as the underlying mechanism to transfer information between a computing system of a user, a cloud-based account of the user (e.g., for hosted email, social networking, etc.), and a mobile device (e.g., cell phone) of the user. In other words, to not think of such components as being distinct from one another, the approaches described herein allow for such components to be treated as invisible components of a unified system which, collectively, offers high computation power and storage (for example, by leveraging the cloud computing system), high portability (for example, by leveraging the mobile device), and fast access to medium sized data and medium computation (for example, by leveraging the computing system and its communications link (e.g., Wi-Fi, Bluetooth, etc.) to the mobile device, and its high-speed connection to the cloud computing system). In such a consumer-oriented business model, the SQL-driven distributed operating system 202 may provide local connectivity, as described, as well as global connectivity, interconnecting local users. In either case, consumer business models applicable to network service providers, be they wireless data (e.g., Wi-Fi) providers or Internet service providers, can become possible in the data management domain, which is traditionally subject to enterprise business models.

In various embodiments, a light footprint version of the SQL-driven distributed operating system 202 that operates on commodity, consumer hardware, such as cell phones or tablets, as well as TV set-top boxes and gaming consoles, may turn such simple devices into compute nodes of a larger, server-class distributed system composed of elementary non-server-class components. This approach is similar in principle to the manner in which Redundant Arrays of Independent Disks (RAID) systems use multiple low-end disks as components to build server-class storage systems. For example, consumer cell phones in Europe, while they recharge at night, may be used for daytime business operations in the United States. Similarly, home gaming consoles, which possess powerful graphics processing hardware capable of massive, yet niche, computations at high-speed, may be used during business hours by businesses. In this manner, the SQL-driven distributed operating system 202 can extend the business models mentioned above to a global scale, involving participants with a wide range of equipment.

The light footprint version of the SQL-driven distributed operating system 202 may operate on any computer-enabled device, such as vehicles, electricity meters, or voltmeters. Thus, a car manufacturer may use the SQL-driven distributed operating system 202 to monitor vehicle location for anti-theft purposes, to monitor engine performance to recommend repairs or maintenance, or to issue recall notifications via the on-board computer. In another example, a utility company may use the SQL-driven distributed operating system 202 to measure electricity consumption for billing purposes or to enable junior field technicians to communicate their measurement with senior main office technicians who can assist with troubleshooting.

In these example scenarios, data movement can be augmented with computation and analysis, possibly against additional data sources. For example, if the gas consumption of a vehicle does not match terrain information at the vehicle's location—which can involve an analytical computation requiring access to global map information and aggregate statistics on engine performance—this may suggest an engine problem. Electricity consumption may also be compared to normal patterns and possibly correlated to temperature information, for example. The analysis descried with respect to the example scenarios may lead to actions that can also be taken via the SQL-driven distributed operating system 202. For example, in the event of vehicle theft, the SQL-driven distributed operating system 202 may turn off the engine of a stolen vehicle. In another example, in the event of a flood, the SQL-driven distributed operating system 202 may turn off electricity supply to flooded areas to minimize the risk of electrocution. In the example scenarios described above, the SQL-driven distributed operating system 202 can facilitate the development of applications to which the SQL-driven distributed operating system 202 serves as the underlying platform. Business models applicable to general software platforms may thus become viable in setting where, thus far, software has been a minor participant rather than a core technology.

Another historical pattern that has emerged in computing is the gradual speed-up in the cycle of experimentation. This cycle consists of composing a program (or a model), running the program (or a simulation), evaluating the results, altering the program, and re-running it, and so on. This cycle of iterative improvement is natural to scientific exploration in general, but, in computing, the duration of this cycle has been drastically reduced over the years. In the early days, the slowest part of the above-described cycle was running the program, leading to extensive human operator downtime. Nowadays, for most computer tasks, the human operator has little downtime and productivity has risen dramatically because computers have grown faster. Moreover, computer languages and tools have developed that make it much easier to express a desired computation naturally, or by leveraging existing technologies and paradigms: not every human operator has to reinvent the same wheel. However, for many tasks involving complex computation or massive amounts of data, the execution time dominates and, for large-scale distributed computing and storage, the infrastructure is still immature and complex for human operators to handle.

In various embodiments, the SQL-driven distributed operating system 202 can be configured to address both of the above-mentioned dimensions. For example, as noted earlier, the SQL-driven distributed operating system 202 is a high-performance system that optimizes across numerous dimensions. Further, the user experience is at a high-level of abstraction and quite a bit removed from the underlying mechanics, which the SQL-driven distributed operating system 202 manages transparently on behalf of most users (administrators of the SQL-driven distributed operating system 202 being excluded). In one example, the SQL-driven distributed operating system 202 is able to achieve both goals through a mixed use of SQL, Jython, Java, other UDF composition languages, and native tools. For example, SQL is a well-known functional/declarative language, and thus expresses the desired computation in a manner that is colloquially described as "tell me what outcome you want". This is generally a simple task for the user, which provides the SQL-driven distributed operating system 202 a lot of latitude in choosing the steps that lead to the desired outcome so that those steps will execute in the shortest time possible. SQL, as implemented by the SQL-driven distributed operating system 202, can include support for advanced SQL features, such as triggers and common table expressions, so that the user may compose complex control flows (e.g. conditional execution or tail recursion) wholly within SQL and thus leverage its declarative nature and the ability of the SQL-driven distributed operating system 202 to optimize execution of these flows. Jython is also a well-known language, but a procedural/imperative one, which can express a computation as "tell me what steps I should take so that the outcome of those steps will match your intent". This is a far more natural language for classically trained computer scientists to express their algorithms. Moreover, Jython can use Java packages seamlessly, which means that the user may leverage a large amount of pre-existing software as building blocks to solve larger problems. Native tools typically cannot be optimized, but they provide ready-made solutions to subproblems, and can thus be readily used as building blocks.

Returning to the original point, the SQL-driven distributed operating system 202 enables productivity gains via higher performance and ease of expressing new algorithms, which in turns shortens the duration of the cycle of experimentation, leading to faster innovation. This makes it possible for the SQL-driven distributed operating system 202 to adopt business models that quantify not only the use of the SQL-driven distributed operating system 202 (e.g., number of queries executed), but also the increase in productivity (e.g., time saved in completing an experimental cycle). Additionally, the SQL-driven distributed operating system 202 possesses two key abilities that enable the SQL-driven distributed operating system 202 to be deployed as a side-by-side solution to existing systems. For example, the SQL-driven distributed operating system 202 may act on data in situ, without first migrating the data into storage owned and managed by the SQL-driven distributed operating system 202. Moreover, the SQL-driven distributed operating system 202 is able to run on both bare-metal systems (where the hardware is controlled by the operating system and the SQL-driven distributed operating system 202 is installed as a software application within that operating system) as well as on virtualized systems (where, typically, the hardware is controlled by a host operating system, on which a virtual machine application creates the perception of an independent virtual hardware with its own, distinct guest operating system, and the SQL-driven distributed operating system 202 is installed as a software application within the guest operating system). The latter mechanism means that virtual, not physical, hardware is sufficient for the SQL-driven distributed operating system 202 to become available within an enterprise or even on a personal computer.

The above-described features and approaches can enable business models that allow for gradual adoption of the SQL-driven distributed operating system 202 with little commitment, or a large upfront expenditure in capital, or staffing, or time spent in data migration; for example, a rental model. Moreover, the ability of the SQL-driven distributed operating system 202 to perform massive computation on a cloud despite a small on-premises footprint (to gain access to on-premises data sources) enables use of elastic costing models (pay-as-you-go and pay-for-what-you-use).

Figure 3:
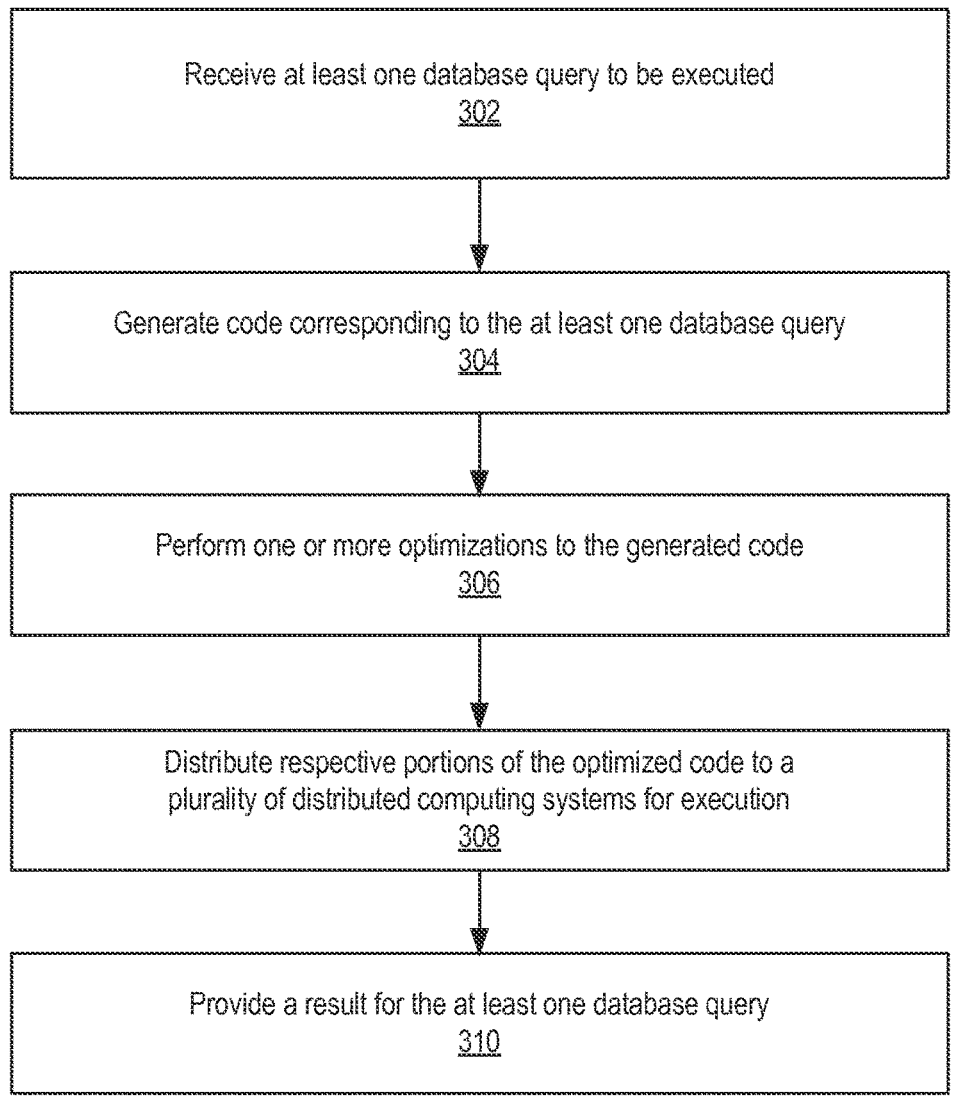
FIG. 3 illustrates an example method for performing distributed query execution, according to an embodiment of the present disclosure.

FIG. 3 illustrates an example method 300 for performing distributed query execution, according to an embodiment of the present disclosure. It should be appreciated that there can be additional, fewer, or alternative steps performed in similar or alternative orders, or in parallel, within the scope of the various embodiments unless otherwise stated.

At block 302, at least one database query to be executed is received. At block 304, code corresponding to the at least one database query is generated. At block 306, one or more optimizations to the generated code are performed. At block 308, respective portions of the optimized code are distributed to a plurality of distributed computing systems for execution. In some embodiments, each of the distributed computing systems is connected to a portion of the plurality of distributed computing systems. At block 310, a result for the at least one database query is provided.

Hardware Implementation

Figure 4:
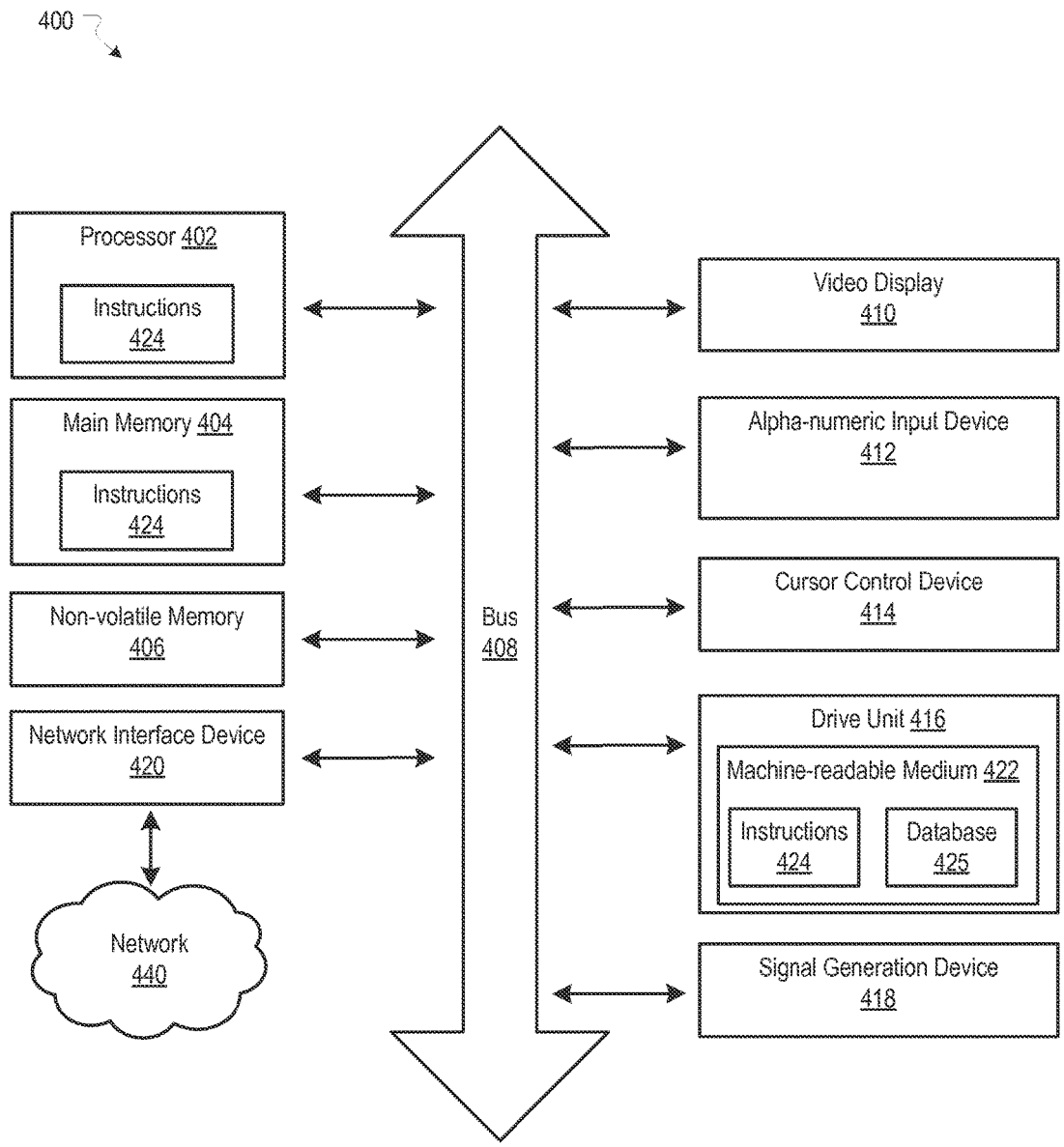
FIG. 4 is a diagrammatic representation of an embodiment of the machine, within which a set of instructions for causing the machine to perform one or more of the embodiments described herein can be executed, according to an embodiment of the present disclosure.

FIG. 4 is a diagrammatic representation of an embodiment of the machine 400, within which a set of instructions for causing the machine to perform one or more of the embodiments described herein can be executed. The machine may be connected (e.g., networked) to other machines. In a networked deployment, the machine may operate in the capacity of a server or a client machine in a client-server network environment, or as a peer machine in a peer-to-peer (or distributed) network environment. In one embodiment, the machine communicates with the server to facilitate operations of the server and/or to access the operations of the server.

The machine 400 includes a processor 402 (e.g., a central processing unit (CPU), a graphics processing unit (GPU), or both), a main memory 404, and a nonvolatile memory 406 (e.g., volatile RAM and non-volatile RAM), which communicate with each other via a bus 408. In some embodiments, the machine 400 can be a desktop computer, a laptop computer, personal digital assistant (PDA), or mobile phone, for example. In one embodiment, the machine 400 also includes a video display 410, an alphanumeric input device 412 (e.g., a keyboard), a cursor control device 414 (e.g., a mouse), a drive unit 416, a signal generation device 418 (e.g., a speaker) and a network interface device 420.

In one embodiment, the video display 410 includes a touch sensitive screen for user input. In one embodiment, the touch sensitive screen is used instead of a keyboard and mouse. The disk drive unit 416 includes a machine-readable medium 422 on which is stored one or more sets of instructions 424 (e.g., software) embodying any one or more of the methodologies or functions described herein. The instructions 424 can also reside, completely or at least partially, within the main memory 404 and/or within the processor 402 during execution thereof by the computer system 400. The instructions 424 can further be transmitted or received over a network 440 via the network interface device 420. In some embodiments, the machine-readable medium 422 also includes a database 425.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to any of the computer systems described herein through a network interface such as a modem or Ethernet interface, can also be used.

While the machine-readable medium 422 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals. The term "storage module" as used herein may be implemented using a machine-readable medium.

In general, routines executed to implement the embodiments of the invention can be implemented as part of an operating system or a specific application, component, program, object, module or sequence of instructions referred to as "programs" or "applications". For example, one or more programs or applications can be used to execute any or all of the functionality, techniques, and processes described herein. The programs or applications typically comprise one or more instructions set at various times in various memory and storage devices in the machine and that, when read and executed by one or more processors, cause the machine to perform operations to execute elements involving the various aspects of the embodiments described herein.

The executable routines and data may be stored in various places, including, for example, ROM, volatile RAM, non-volatile memory, and/or cache. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of machines, those skilled in the art will appreciate that the various embodiments are capable of being distributed as a program product in a variety of forms, and that the embodiments described herein apply equally regardless of the particular type of machine- or computer-readable media used to actually effect the distribution. Examples of machine-readable media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", or the like means that a particular feature, design, structure, or characteristic described in connection with the embodiment is included in at least one embodiment of the disclosure. The appearances of, for example, the phrases "according to an embodiment", "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention, both independently and as an overall system, and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

What is claimed is:

1. A computer-implemented method comprising:
receiving, by a computing system that comprises one or more processors, a database query to be executed;
generating, by the computing system, code corresponding to the database query;
performing, by the computing system, one or more optimizations to the generated code to produce specialized modular code, the one or more optimizations including at least a Just-In-Time (JIT) compilation technique that modifies at least a portion of the generated code to tailor the portion of generated code to a particular distributed computing system of a plurality of distributed computing systems;
distributing, by the computing system, respective portions of the modular code to the plurality of distributed computing systems for execution, each of the distributed computing systems being connected to a portion of the plurality of distributed computing systems, and wherein at least the modified portion of the modular code tailored to the particular computing system is distributed to the particular computing system for execution; and providing, by the computing system, a result for the database query.

2. The computer-implemented method of claim 1, wherein the specialized modular code for the at least one database query is generated entirely on-the-fly.

3. The computer-implemented method of claim 1, wherein performing, by the computing system, one or more optimizations to the generated code further comprises:
  performing, by the computing system, at least one of: register allocation, inlining, constant folding, loop strength reduction, or loop-invariant code motion.

4. The computer-implemented method of claim 1, wherein performing, by the computing system, one or more optimizations to the generated code further comprises:
  combining, by the computing system, the generated code with at least a portion of pre-compiled code.

5. The computer-implemented method of claim 4, wherein the code for the at least one database query is generated entirely on-the-fly and wherein the pre-compiled code is generated prior to receiving the at least one database query.

6. The computer-implemented method of claim 4, wherein the pre-compiled code is customized based at least in part on the code generated for the database query.

7. The computer-implemented method of claim 4, wherein the pre-compiled code is written in a high-level programming language.

8. The computer-implemented method of claim 4, wherein the pre-compiled code, when executed, performs vectorized instructions (SIMD) with a variable number of operands, and wherein combining, by the computing system, the generated code with at least a portion of pre-compiled code further comprises:
  customizing, by the computing system, the vectorized instructions (SIMD) using one or more operands included in the database query.

9. The computer-implemented method of claim 1, wherein execution of the code is based at least in part on one or more iterator-based execution nodes, wherein respective code associated with the one or more iterator-based execution nodes is able to be suppressed upon determining that the respective code does not need to be executed.

10. The computer-implemented method of claim 9, wherein performing, by the computing system, the one or more optimizations to the generated code further comprises:
  performing, by the computing system, one or more levels of code optimization, wherein each level of optimization introduces a further specialization to the code, and wherein each level of optimization is cached.

11. The computer-implemented method of claim 9, wherein at least one result associated with an iterator-based execution node resides in one or more processor registers and does not materialize into memory.

12. The computer-implemented method of claim 9, further comprising:
  determining that the database query involves manipulation of one or more nested arrays; and
  evaluating the one or more nested arrays based at least in part on the one or more iterator-based execution nodes.

13. The computer-implemented method of claim 12, wherein evaluating the one or more nested arrays further comprises:
  processing each array in the one or more nested arrays as a series of rows.

14. The computer-implemented method of claim 1, wherein the computing system utilizes a caching mechanism that allows data items to be scheduled to the same distributed computing system across instances of a same query as the at least one database query.

15. The computer-implemented method of claim 1, wherein the computing system utilizes a caching mechanism that allows data items to be scheduled to the same distributed computing system across instances of different queries.

16. The computer-implemented method of claim 1, the method further comprising:
  determining, by the computing system, that at least one of the distributed computing systems are non-responsive; and
  re-distributing, by the computing system, respective portions of the optimized code corresponding to the at least one of the distributed computing system to one or more of the distributed computing systems that are responsive.

17. The computer-implemented method of claim 16, wherein determining, by the computing system, that at least one of the distributed computing systems are non-responsive further comprises:
  determining, by the computing system, that at least one of the distributed computing systems are non-responsive while the at least one database query is being executed.

18. The computer-implemented method of claim 1, distributing, by the computing system, respective portions of the optimized code to a plurality of distributed computing systems for execution further comprises:
  dispatching, by the computing system, the respective portions of the optimized code to a plurality of distributed computing systems based at least in part on a local chunked sort technique.

19. A system comprising:
  at least one processor; and
  a memory storing instructions that, when executed by the at least one processor, cause the system to perform:
    receiving a database query to be executed;
    generating code corresponding to the database query;
    performing one or more optimizations to the generated code, the one or more optimizations including at least a Just-In-Time (JIT) compilation technique that modifies at least a portion of the generated code to tailor the portion of generated code to a particular type of distributed computing system of a plurality of distributed computing systems types;
    distributing respective portions of the optimized code to a plurality of distributed computing systems for execution, each of the distributed computing systems being connected to a portion of the plurality of distributed computing systems, and wherein at least the modified portion of the generated code tailored to the particular type of computing system is distributed to a particular computing system of the particular type for execution; and
    providing a result for the database query.

20. A computer-readable hardware storage medium including instructions that, when executed by at least one processor of a computing system, cause the computing system to perform:
  receiving at least one database query to be executed;
  generating code corresponding to the at least one database query;

performing one or more optimizations to the generated code, the one or more optimizations including at least a Just-In-Time (JIT) compilation technique that modifies at least a portion of the generated code to tailor the portion of generated code to a particular type of distributed computing system of a plurality of distributed computing systems types;

distributing respective portions of the optimized code to a plurality of distributed computing systems for execution, wherein each of the distributed computing systems is connected to a portion of the plurality of distributed computing systems, and wherein at least the modified portion of the generated code tailored to the particular type of computing system is distributed to a particular computing system of the particular type for execution; and providing a result for the at least one database query.

* * * * *